United States Patent
Takashima

(10) Patent No.: US 8,078,005 B2
(45) Date of Patent: Dec. 13, 2011

(54) METHOD FOR CONTROLLING THE COMBINING OF ORIGINAL IMAGE DATA AND CODED IMAGE DATA

(75) Inventor: Keiichi Takashima, Kawasaki (JP)

(73) Assignee: Canon Kabushiki Kaisha (JP)

( * ) Notice: Subject to any disclaimer, the term of this patent is extended or adjusted under 35 U.S.C. 154(b) by 896 days.

(21) Appl. No.: 12/111,460

(22) Filed: Apr. 29, 2008

(65) Prior Publication Data

US 2008/0273813 A1    Nov. 6, 2008

(30) Foreign Application Priority Data

May 2, 2007    (JP) .................. 2007-121600

(51) Int. Cl.
*G06K 9/36*    (2006.01)
*G06K 1/00*    (2006.01)
(52) U.S. Cl. .......... 382/284; 382/232; 358/1.18
(58) Field of Classification Search .......... 382/232, 382/254, 256, 276, 284, 298, 305, 312; 358/1.2, 358/1.18, 501, 508, 537; 375/240.13, 240.18, 375/240.23, 240.24, 240.25, 240.27
See application file for complete search history.

(56) References Cited

U.S. PATENT DOCUMENTS

| | | | | |
|---|---|---|---|---|
| 4,291,992 A | * | 9/1981 | Barr et al. | 400/124.05 |
| 6,160,633 A | * | 12/2000 | Mori | 358/1.5 |
| 6,462,836 B1 | * | 10/2002 | Sato et al. | 358/3.01 |
| 6,535,645 B2 | * | 3/2003 | Bright et al. | 382/248 |
| 7,437,011 B2 | * | 10/2008 | Kato | 382/251 |
| 7,653,133 B2 | * | 1/2010 | Woods et al. | 375/240.13 |
| 2003/0099293 A1 | * | 5/2003 | Okada et al. | 375/240.13 |
| 2006/0098901 A1 | | 5/2006 | Hino | |
| 2007/0176355 A1 | * | 8/2007 | Sasaki et al. | 271/183 |

FOREIGN PATENT DOCUMENTS

| | | |
|---|---|---|
| JP | 08-154177 A | 6/1996 |
| JP | 2002-118734 A | 4/2002 |
| JP | 2004-282439 A | 10/2004 |
| JP | 2006-135444 A | 5/2006 |
| JP | 2007-021960 A | 2/2007 |
| JP | 2007-026353 A | 2/2007 |

OTHER PUBLICATIONS

Office Action issued in corresponding Japanese Patent Application No. 2007-121600 dated Apr. 24, 2009.

* cited by examiner

*Primary Examiner* — Kanjibhai Patel
(74) *Attorney, Agent, or Firm* — Rossi, Kimms & McDowell LLP

(57) ABSTRACT

An information processing device is provided that combines original image data and coded image data in a mutually non-overlapping manner. The information processing device generates coded image data to be combined with original image data. Next, the information process device determines whether or not the object region within the original image data and the generated coded image data region are overlapping. If it is determined that an overlap occurs, the information processing device modifies the shape of the coded image data region in accordance with instructions from a user. Next, the information processing device combines and prints the changed coded image data and the original image data.

13 Claims, 16 Drawing Sheets

METHOD FOR CONTROLLING THE COMBINING OF ORIGINAL IMAGE DATA AND CODED IMAGE DATA

BACKGROUND OF THE INVENTION

1. Field of the Invention

The present invention relates to an information processing device capable of generating coded image data.

2. Description of the Related Art

There exists one-dimensional coding technology, as typified by barcodes, as well as two-dimensional coding technology, as typified by QR codes.

With such technology, information to be encoded is encoded to create coded image data, and the coded image data thus created is output upon a printing medium, thereby creating printed materials having a coded image thereon.

In addition, with this technology, the coded image thus created is optically scanned, thereby creating coded image data. By decoding the coded image data thus created, the information described above is read out.

The coded image data may be output singly upon a printing medium, but in many cases the coded image data is output in combination with other text, images, or similar data (to be hereinafter referred to as original image data). When combining the data in this case, if the coded image data overlaps with the original image data, there is a high possibility that an error will occur during the subsequent decoding. As an example of a technique for solving the problem, Japanese Patent Laid-Open No. 2006-135444 discloses a technique for combining original image data and coded image data such that they do not overlap. In the technique in the above patent document, the original image data is scaled such that the original image data does not overlap with the coded image data, and then combines the scaled original image data and the coded image data.

However, there is a problem when using the technique disclosed in the above patent document, in that the original image data is reduced in size and becomes hard to read.

SUMMARY OF THE INVENTION

It is an object of the invention to provide technique where, when combining original image data and coded image data, the original image data and the coded image data are combined in a non-overlapping manner, without scaling the original image data.

One aspect of present invention provides a method for controlling an information processing device. The method includes the following steps: generating coded image data to be combined with original image data; determining whether or not an overlap occurs between an object region within the original image data and a region of the coded image data region; generating temporary coded image data in place of the generated coded image data when it is determined that the overlap occurs in the determining step; changing a region shape of the coded image data into a region shape of the generated temporary coded image data in accordance with instructions from a user; and generating new coded image data whose region shape conforms to the region shape of the temporary coded image data, and generating print data so that the new coded image data and the original image data are combined and printed.

Another aspect of the present invention provides an information processing device. The device includes the following components: a component for generating coded image data to be combined with original image data; a component for determining whether or not an overlap occurs between an object region within the original image data and a region of the coded image data; a component for generating temporary coded image data in place of the generated coded image data when it is determined that the overlap occurs by the determining component; a component for changing a region shape of the coded image data into a region shape of the generated temporary coded image data in accordance with instructions from a user; and a component for generating new coded image data whose region shape conforms to the region shape of the temporary coded image data, and generating print data so that the new generated coded image data and the original image data are combined and printed.

Another aspect of the present invention provides a computer-readable recording medium. The computer-readable recoding medium records executable instructions for performing the above method of controlling an information processing device.

According to the present invention, when combining original image data and coded image data, it becomes possible to combine the original image data and the coded image data in a non-overlapping manner, without performing processing such as size reduction for the original image data. Moreover, in the combining process, a user is able to determine the position and size (i.e., the width and height of a rectangle) of the coded image data while visually confirming the coded image data and the original image data for each page. This enables combining that is appropriate to the original image data.

Further features of the present invention will become apparent from the following description of exemplary embodiments (with reference to the attached drawings).

DESCRIPTION OF THE EMBODIMENTS

The embodiments of the present invention are now described with reference to the drawings.

First Embodiment

[Printing System]

The first Embodiment will now be described in detail with reference to the drawings.

Figure 1:
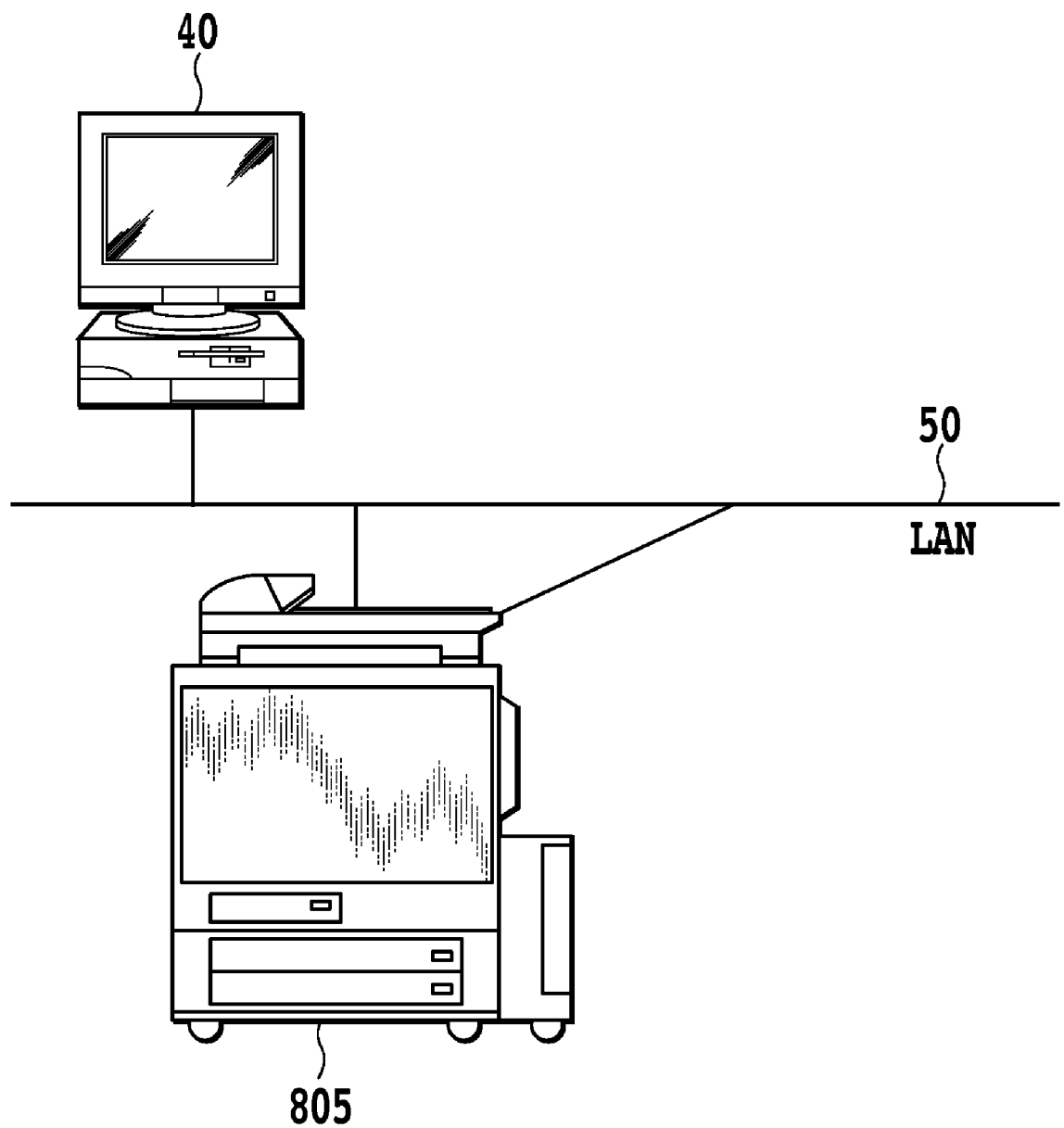
FIG. 1 is a diagram showing an exemplary overall configuration of an image-forming system.

FIG. 1 is a block diagram showing an exemplary configuration of a printing system according to the embodiment of the present invention.

In the printing system, a host computer 40 (an information processing device) and a printer 805 (an image-forming device) are connected to a LAN 50. However, in the printing system according to the embodiment, the number of these connections is not limited. In addition, while the LAN 50 is implemented as a connection method in the embodiment, the embodiment is not limited thereto. For example, it is also possible to implement an arbitrary network such as a wide area network (WAN), a serial transmission system such as USB, or a parallel transmission system such as Centronix or SCSI.

The host computer 40 (hereinafter called PC) has the functions of a personal computer. The PC 40 can send and receive files and e-mail using protocols such as FTP and SMB via the LAN 50 or a WAN. In addition, the PC 40 can also send print commands to an image-forming device (not shown) via a printer driver.

Hereinafter, a coded image refers to a two-dimensional coded image, a barcode image, or a digital watermark image generated by digital watermarking technology.

[Host Computer]

Figure 2:
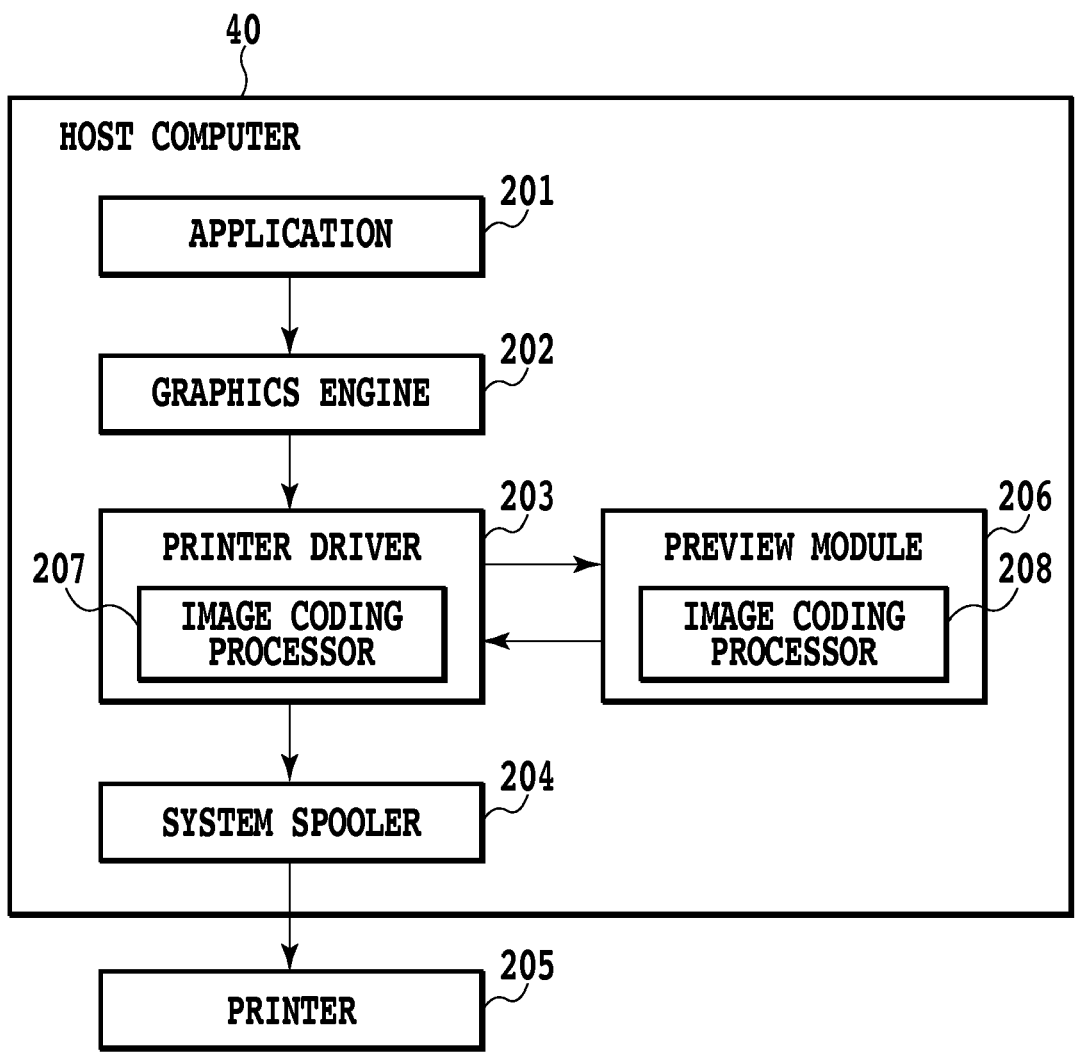
FIG. 2 is a block diagram showing an exemplary configuration of a print system of a host computer connected to a printer.

FIG. 2 shows an exemplary configuration for performing print processing on the host computer 40 shown in FIG. 1.

An application 201, a graphics engine 202, a printer driver 203, and a system spooler 204 are program modules existing as files stored in an external storage device. During execution, these modules are stored into RAM and executed by an OS or a module using these modules. When the application 201 performs printing using the printer 205, the executable graphics engine 202 stored into RAM is used to output data (draw data) to the printer 205.

The graphics engine 202 stores one of a plurality of printer drivers 203 that have been prepared for each printing device such as a printer into RAM from the external storage device. The output of the application 201 is then configured in the printer driver 203. Subsequently, GDI (Graphics Device Interface) functions received from the application 201 are converted into DDI (Device Driver Interface) functions, and the DDI functions are output to the printer driver 203.

Based on the DDI functions received from the graphics engine 202, the printer driver 203 converts the data into control commands recognizable by the printer, such as PDL (Page Description Language) commands, for example. The system is configured such that the converted printer control commands are output as print data to the printer 205 via a bidirectional interface by way of the system spooler 204 stored into RAM by the OS.

The printing system of the embodiment also has a preview module 206 cooperatively operated with the printer driver, as well as an image coding processor 207 internal to the printer driver 203.

The preview module 206 includes internally an image coding processor 208 similar to the image coding processor 207. The preview module 206 (including the image coding processor 208) and the image coding processor 207 may be built-in modules in the printer driver 203, or they may be in a library module format and added by a separate installation. In addition, with regard to the printing of coded image, the printer driver 203 performs image coding processing to be hereinafter described by performing the preview module 206 and the image coding processors 207 and 208.

[Coded image Print Settings]

Figure 10:
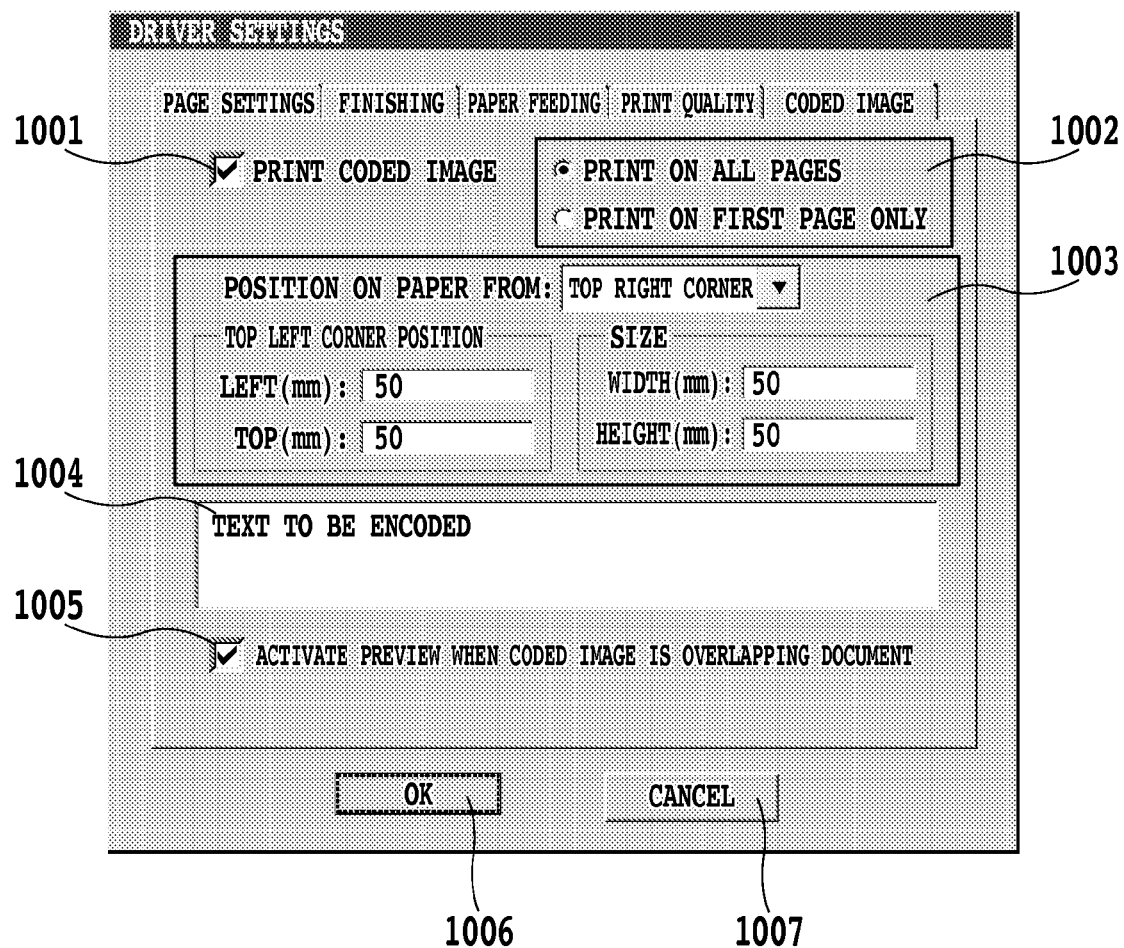
FIG. 10 is a diagram showing an exemplary coded image print dialog box.

FIG. 10 shows an exemplary dialog box related to the printing of coded image data and original image data.

When a user instructs to set a check box 1001 to ON, the printer driver, having received the user's instruction, sets the check box to ON. Subsequently, the printer driver activates a function of combining a coded image data with a print data generated from an original image data, and performs a control for receiving user's instructions for other settings items.

A radio button 1002 is used for setting for controlling the pages whereupon the coded image data is printed. In the dialog box, this setting can be configured to print the coded image data on all pages or on the first page only. However, pages may also be specified in more detail.

The printed position and size of the coded image data is configured by the user using a control group 1003.

The information to be encoded into the coded image data is input by the user to a text box 1004. The dialog box shows that textual information is encoded, but binary information such as image data may also be encoded by allowing a path and file name to be specified herein.

When the user instructs to set a check box 1005 to ON, the printer driver, having received the instructions, sets the check box to ON. Subsequently, the printer driver automatically activates the preview module 206 to be hereinafter described, if the coded image data, having the position and size configured by the user in the control group 1003, overlaps with the original image data.

When the user clicks a button 1006, the printer driver stores the setting contents in the RAM of the host computer 40 or the external storage device, and then performs a control for closing the dialog box. The image coding processor 207 then refers to these setting contents when processing the coded image data.

When the user clicks a button 1007, the printer driver performs a control for closing the configuration dialog without storing the configured settings. In addition, these coded image print settings may also be automatically configured by a program control from an application.

[Image Coding Processor]

Figure 3:
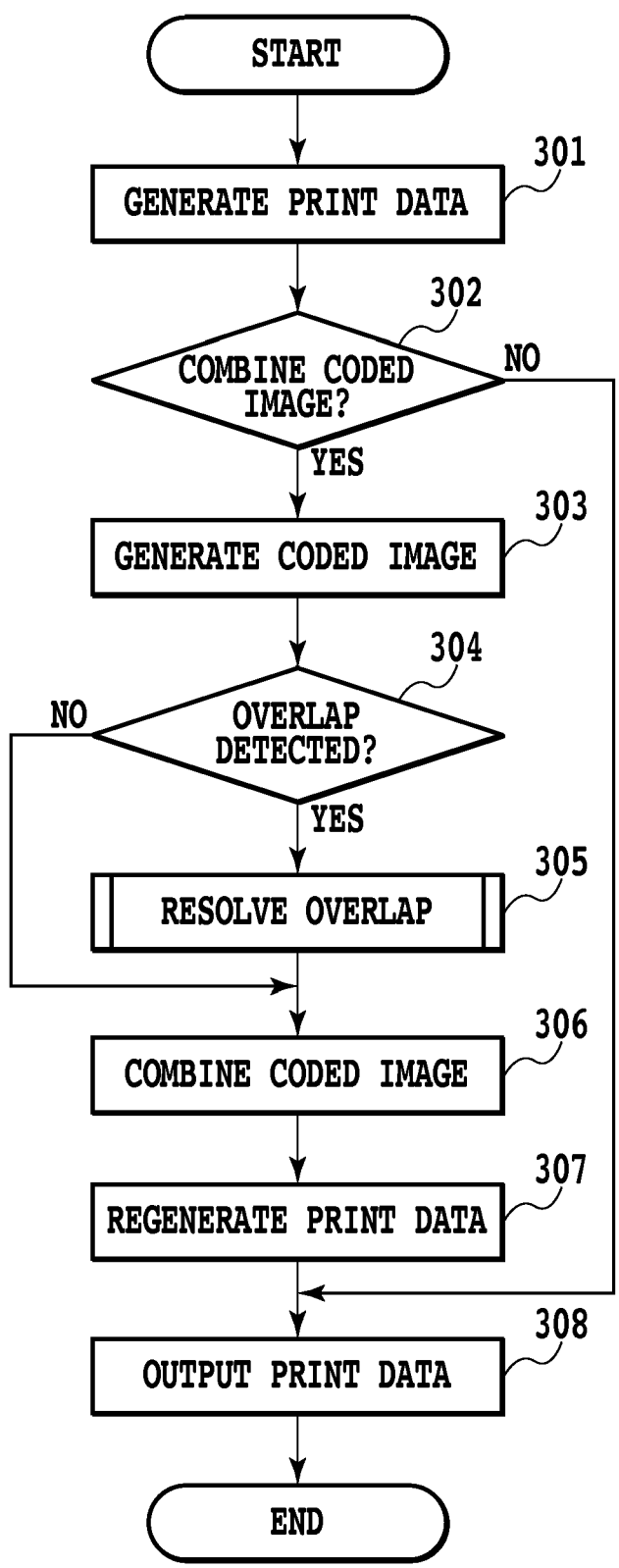
FIG. 3 is a flowchart showing an exemplary coded image combining print processing by a printer driver.

FIG. 3 is a flowchart illustrating an exemplary overall process flow of print data output performed by the printer driver 203.

First, the printer driver 203, having received a print request from the graphics engine 202, generates print data recognizable by the printer (Step 301). Upon generating the print data, the image coding processor 207 refers to the coded image print settings stored in the RAM of the host computer 40 or the external storage device. Subsequently, the image coding processor 207 determines whether or not the setting is configured whereby coded image data is combined with the print data generated from the original image data (Step 302). In the case of the coded image print dialog box shown in FIG. 10, it is determined that the setting to combine coded image data is configured if the check box 1001 is set to ON. If it is determined that the setting to combine coded image data is configured, the image coding processor 207 generates coded image data on the basis of the coded image print settings (Step 303).

The image coding processor 207 refers to the coded image print settings stored in the RAM of the host computer 40 or the external storage device. The image coding processor 207 then determines whether or not the setting is configured whereby overlaps are detected between the object region of the original image data and the coded image data region (Step 304). In the case of FIG. 10, overlap detection is configured if the check box 1005 is set to ON.

If it is determined that the overlap detection setting is configured, the image coding processor 207 performs overlap resolution processing (Step 305). More specifically, the image coding processor 207 uses the preview module 206 to make it such that the object region of the original image data does not overlap with the coded image data region.

If it is determined in Step 304 that the overlap detection setting is not configured, the image coding processor 207 skips Step 305. The image coding processor 207 then combines the coded image data with the original image data, the coded image data having been resolved of overlaps with the object region of the original image data (Step 306).

The image coding processor 207 then regenerates the combined result as print data (Step 307).

The printer driver 203, having received the regenerated print data, then outputs the print data to the printing device (Step 308), and the process ends.

If it is determined in Step 302 that the setting whereby coded image data is combined is not configured, the process proceeds to Step 308.

The printing device, having received the print data in Step 308, analyzes and prints the print data on paper.

Figure 4:
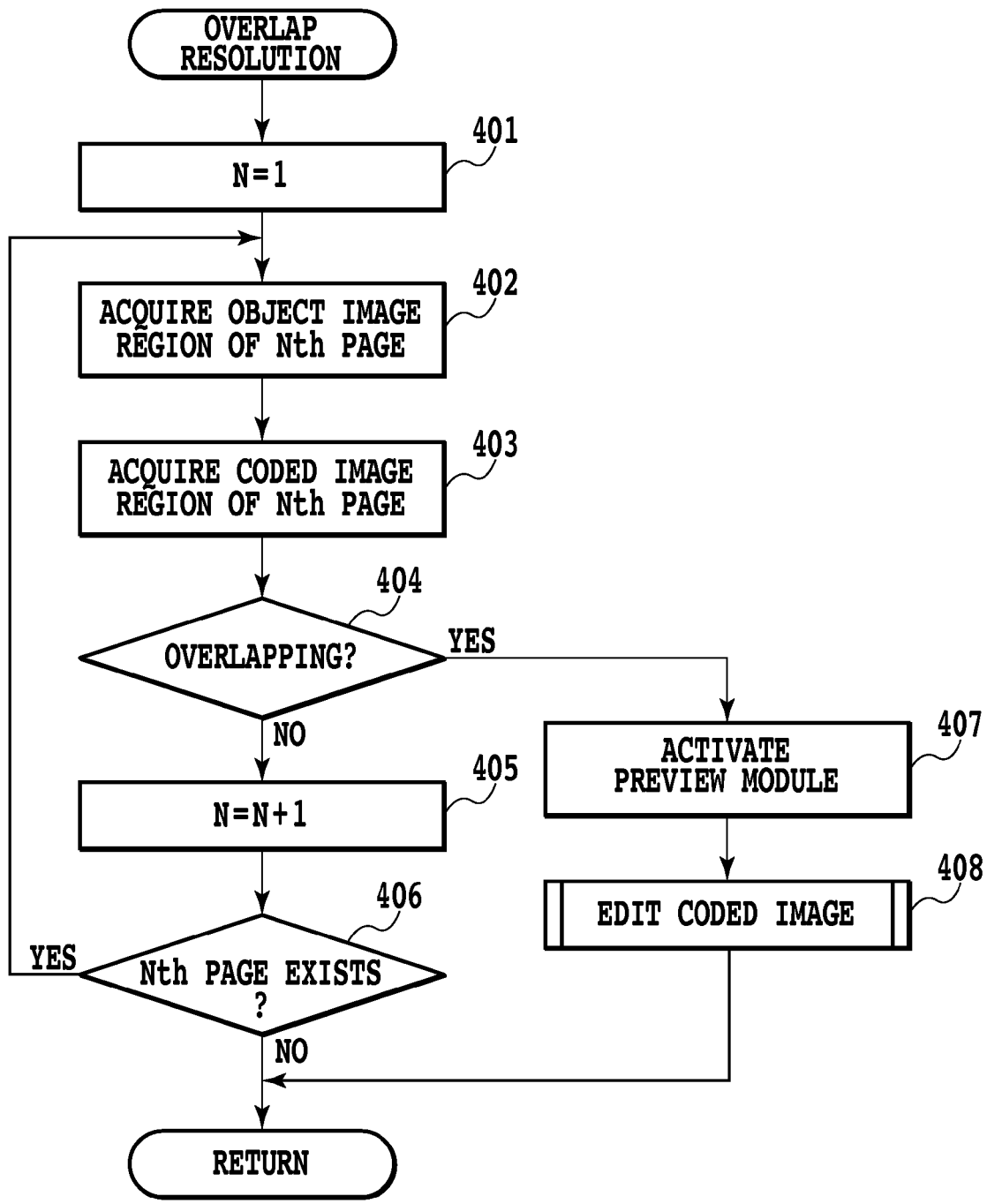
FIG. 4 is a flowchart showing an exemplary coded image combining print processing by a printer driver.

FIG. 4 is a flowchart illustrating an exemplary flow of the overlap resolution processing 305 performed by the image coding processor 207.

Figure 11:
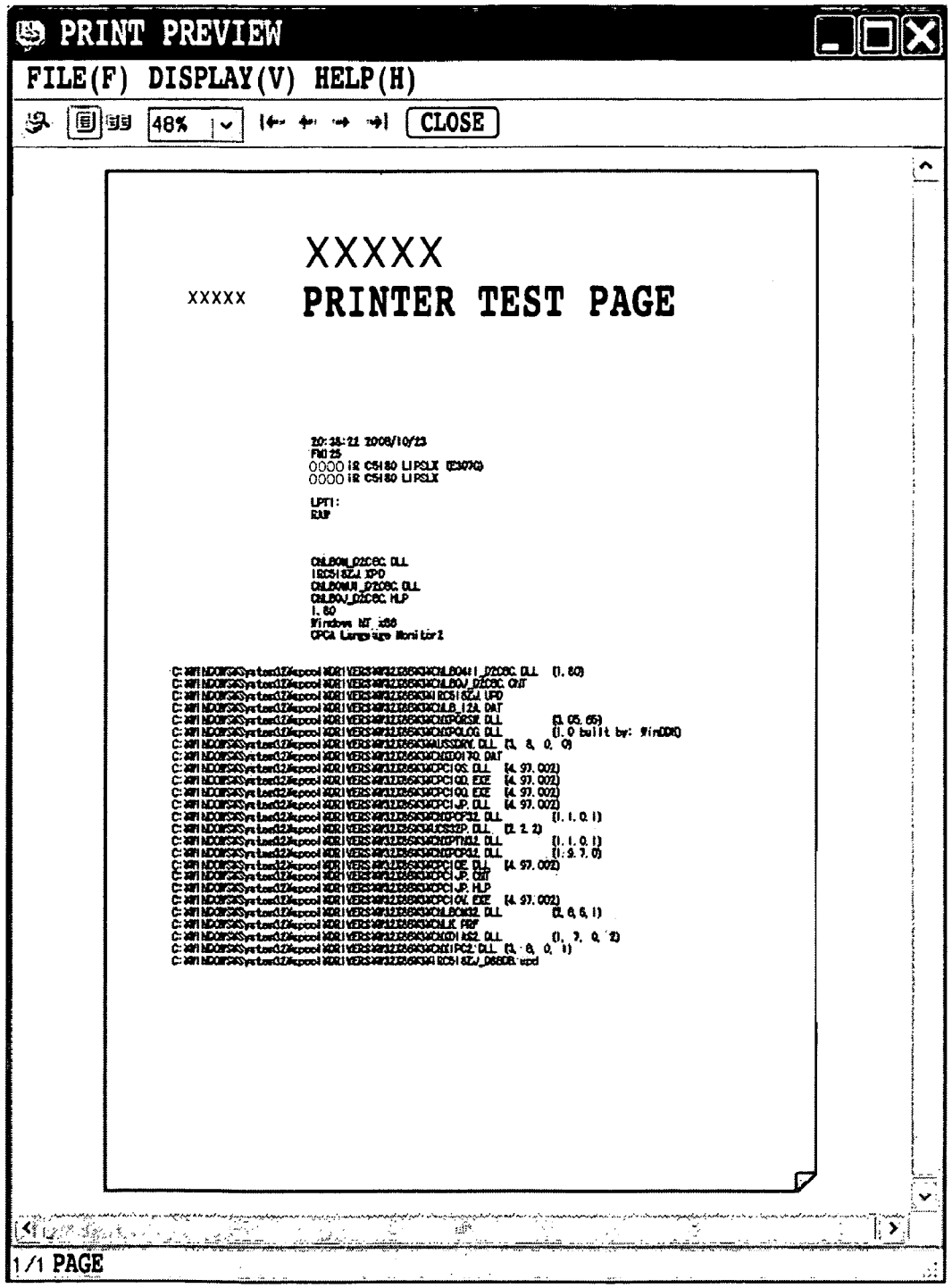
FIG. 11 is an explanatory diagram showing an exemplary an object region.

First, a page counter N is initialized (Step 401), and the object region for the Nth page is acquired (Step 402). This object region is not the circumscribed rectangular region of the entire Nth page, but rather a group of the circumscribed rectangular regions of the respective drawing objects constituting the original image data on the Nth page. Consequently, the region is irregular, according to the original image. In the case of the page in FIG. 11, the gray region is the object region. Additionally, the image coding processor 207 refers to the coded image print settings stored in the RAM of the host computer 40 or the external storage device, and acquires the coded image data region for the Nth page (Step 403). If the coded image print settings are configured such that coded image data is not to be printed on the Nth page, the coded image data region becomes a blank region. If the coded image print settings are configured such that coded image data is to be printed on the Nth page, the coded image data region is derived from the coded image position and size settings. Next, it is determined if the object region acquired in Step 402 and the coded image data region acquired in Step 403 are overlapping (Step 404). If it is determined that these regions are not overlapping, the page counter N is incremented by 1 (Step 405), and it is then determined if print data for the next page exists (Step 406). If there is the print data for the next page, the process returns to Step 402. If it is determined in Step 404 that the regions are overlapping, the image coding processor 207 activates the preview module 206 (Step 407), the coded image data is edited on the preview module 206 (Step 408), and the process returns.

In the embodiment described as above, the process proceeds to Step 407 and processing is performed for activating the preview module 206 in the case where the object region inside the print data generated from the original image data in Step 301 overlaps with coded image data (including cases wherein there is overlapping on even one page).

[Preview Module]

Figure 5:
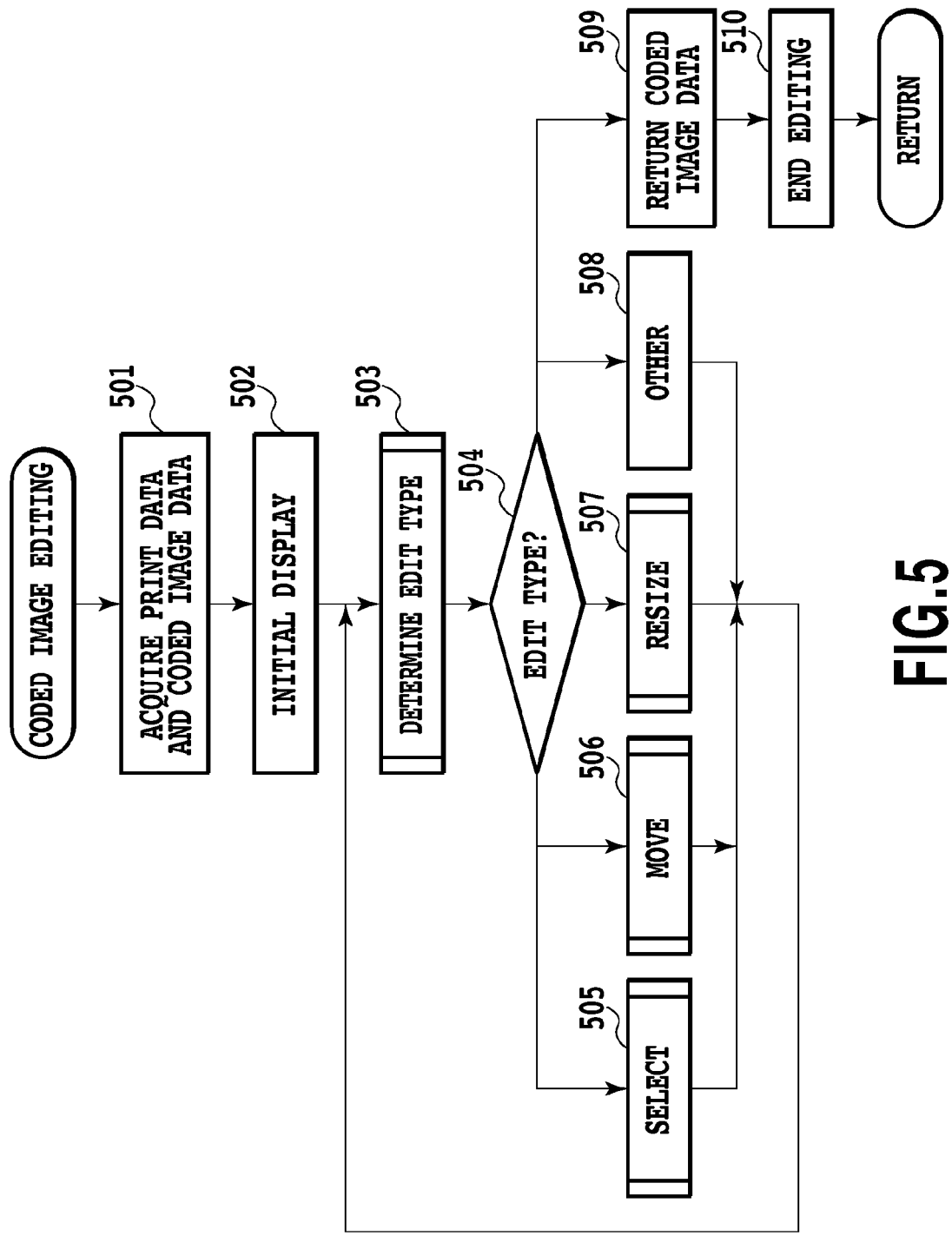
FIG. 5 is a flowchart showing an exemplary coded image combining print processing by a printer driver.

FIG. 5 is a flowchart illustrating an exemplary flow of the coded image editing processing 408 that is performed by the preview module 206.

First, the preview module 206 acquires print data and coded image data from the image coding processor 207 (Step 501), and then displays the coded image data (Step 502). When the initial display ends, the user performs edit operations. The preview module 206 receives these edit operations and then determines the type of the user edit operation (Step 503). In accordance with the determined type of edit operation (Step 504), the preview module 206 then repeatedly performs selection processing (Step 505), move processing (Step 506), resizing processing (Step 507), and other edit processing (Step 508). This other processing includes processing for operations such as changing the displayed page number and scrolling, but further description thereof is omitted herein for the sake of brevity. If it is determined in Step 504 that an end editing operation has been given, the preview module 206 takes the coded image data that is the result of the editing up to that point, and returns the data to the printer driver 203 (Step 509). The preview module 206 is then ended (Step 510).

Figure 6:
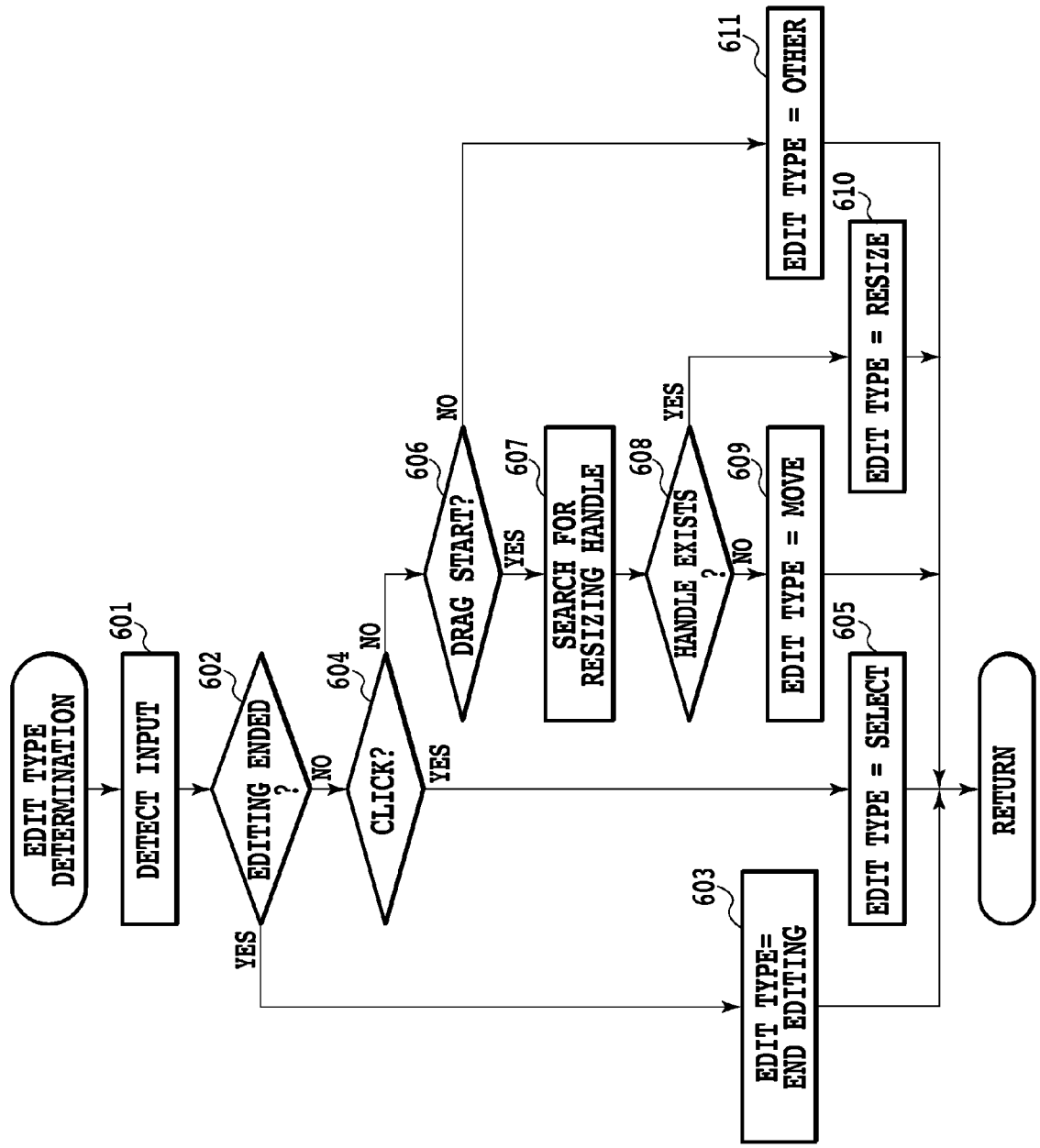
FIG. 6 is a flowchart showing an exemplary coded image combining print processing by a printer driver.

FIG. 6 is a flowchart illustrating an exemplary flow of the edit type determination processing 503 performed by the preview module 206.

First, the preview module 206 detects events of user input from mouse or keyboard, the events being sent from the OS (Step 601), and determines whether or not these events constitute an end editing operation (Step 602). One example of the end editing operation is a method whereby an "End" or "Exit" menu item is selected by a keyboard or mouse operation. If it is determined in Step 602 that the user operation is the end editing operation, the preview module 206 sets the edit type to be "End Editing" (Step 603), and the process returns. If it is determined that the end editing operation has not been given, the preview module 206 determines if the user operation is a mouse click (Step 604). If it is determined that the user operation is the mouse click, the preview module 206 sets the edit type to be "Select" (Step 605), and the process returns.

If it is determined in Step 604 that the user operation is not the mouse click, the preview module 206 determines if the user operation is a drag start (Step 606). If the user operation is determined to be the drag start, it is determined if a resizing handle exists at the coordinates of the drag start (Step 607).

Figure 12:
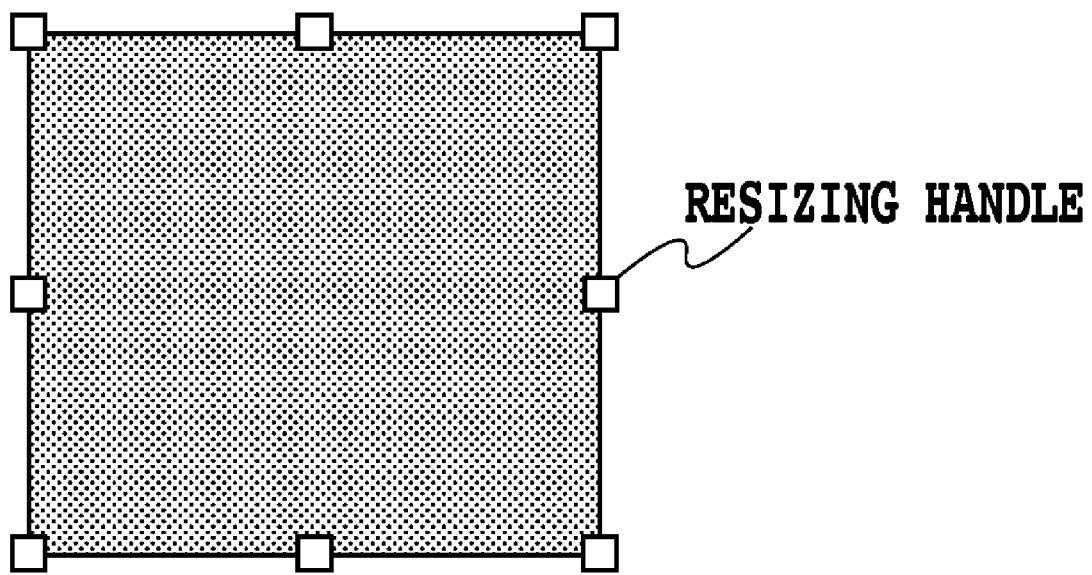
FIG. 12 is an explanatory diagram showing an exemplary resizing handles.

The resizing handle refers to small marks displayed at the vertices and midpoints of the coded image frame of selected coded image data. There are eight such marks, and they become hidden when selection is canceled (refer to FIG. 12). The resizing handles are used by the user in the case where the user issues a command to resize the coded image data (i.e., modify the width and height of a rectangle). Concretely, the resizing processing is performed according to the following procedure. It should be appreciated that the resizing processing may also modify the shape of the coded image data from a rectangle to another, different shape.

The user first issues a command to select the coded image data. In so doing, the preview module 206 receives the select command and displays the resizing handles. Subsequently, the user starts a drag operation over one of the displayed resizing handles, and as a result the preview module 206 resizes the coded image data to conform to this drag operation.

In the exemplary coded image print dialog box shown in FIG. 10, it is not possible to configure settings such that two or more coded image data are printed on a single page. However, it is easy to extend the settings to allow printing of two or more coded image data. In such an extended case, it is possible to allow the selection of two or more coded image data. Even in this case, processing similar to that of Step 607 may be used.

Next, the preview module 206 determines if the resizing handle is found at the coordinates of the drag start in Step 607 (Step 608). If it is determined that the resizing handle is not found, the preview module 206 sets the edit type to be "Move" (Step 609), and the process returns. On the other hand, if it is determined that the resizing handle is found at the coordinates of the drag start, the preview module 206 sets the edit type to be "Resize" (Step 610), and the process returns. If it is determined in Step 606 that the user operation is not a drag start, the preview module 206 sets the edit type to be "Other" (Step 611), and the process returns.

Figure 7:
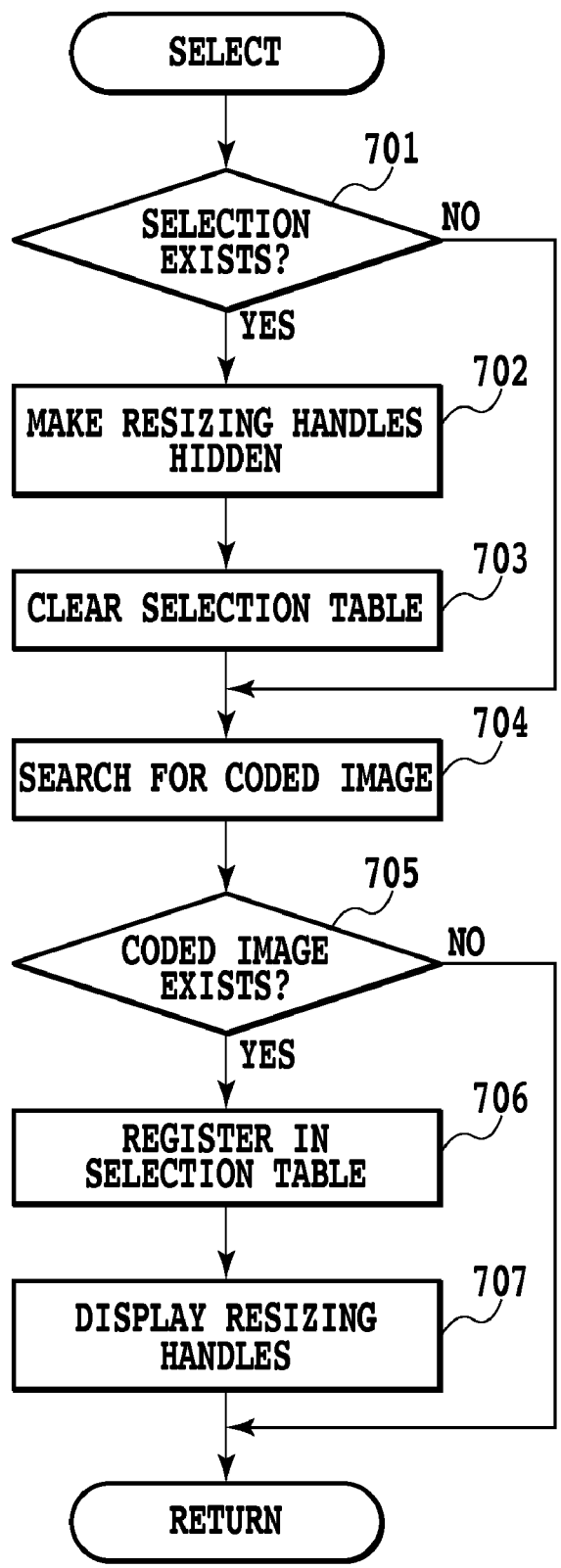
FIG. 7 is a flowchart showing an exemplary coded image combining print processing by a printer driver.

FIG. 7 is a flowchart illustrating an exemplary flow of the selection processing 505 that is performed by the preview module 206.

First, the preview module 206 determines if there exists "coded image data already registered in the selection table" (Step 701). If it is determined in Step 701 that such data exists, the resizing handles of the coded image data registered in the selection table are made hidden (Step 702), and the selection table is cleared (Step 703).

As described above, the "coded image data already registered in the selection table" is deleted from the selection table in order to register new coded image data in the selection table in Step 706, the new coded image data being the data selected between Step 502 and Step 503. The "coded image data already registered in the selection table" refers to coded image data that was previously selected.

Next, the preview module 206 searches for coded image data existing at the coordinates of the click (Step 704), and determines if coded image data is found (Step 705). If it is determined in Step 705 that coded image data is found, the preview module 206 registers in the selection table the coded image data that is found (Step 706), and displays the resizing handles for the coded image data (Step 707). The process then returns.

In the coded image print dialog box shown in FIG. 10, it is not possible to configure settings such that two or more coded image data are printed on a single page. However, it is easy to extend the settings to allow printing of two or more coded image data. In such an extended case, there is the possibility that two or more coded image data may be overlapping each other. For this reason, in Step 704, the preview module 206 may search for the front coded image data existing at the click coordinates.

Figure 8:
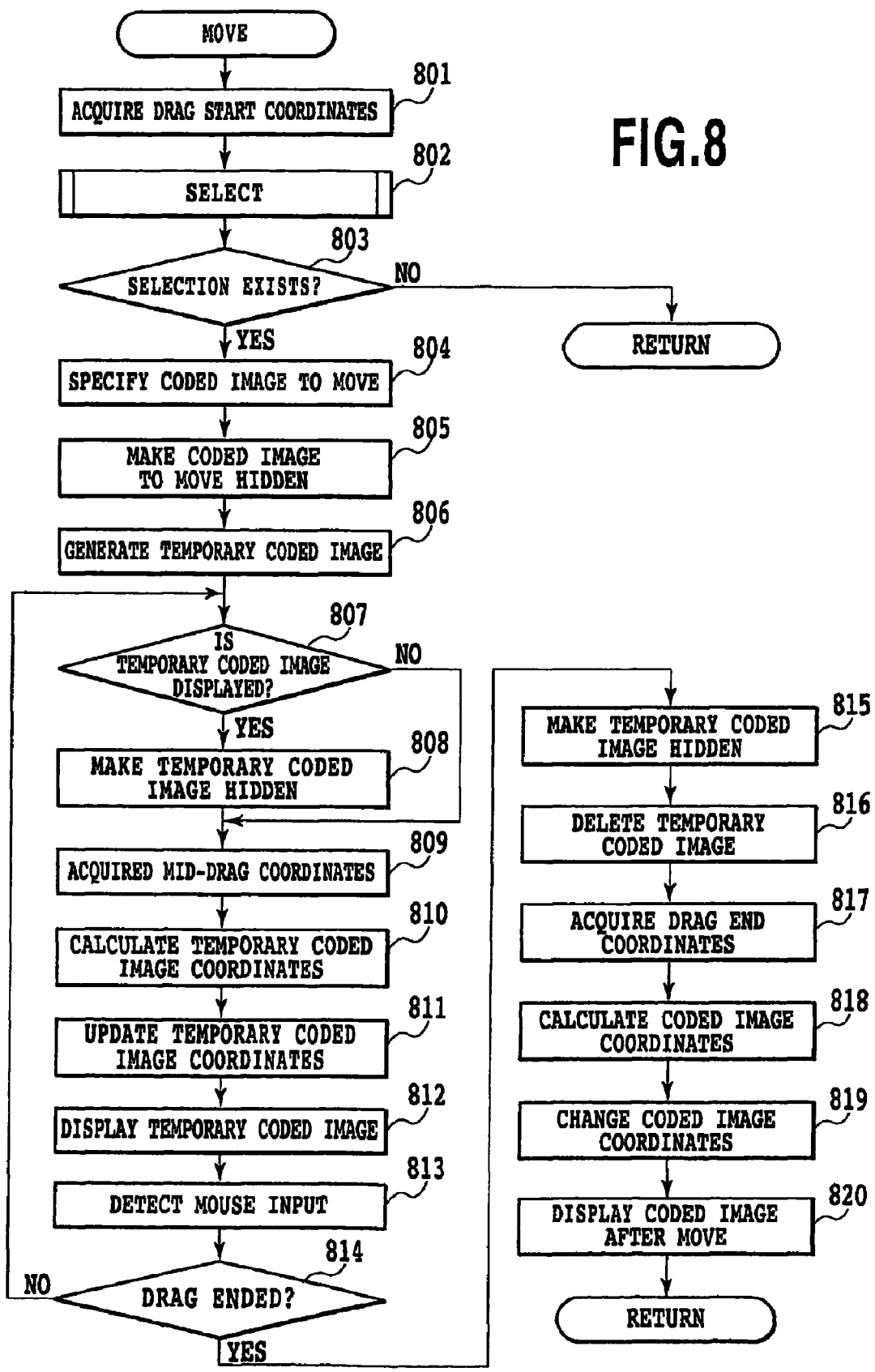
FIG. 8 is a flowchart showing an exemplary coded image combining print processing by a printer driver.

FIG. 8 is a flowchart illustrating an exemplary flow of the move processing 506 performed by the preview module 206.

First, the preview module 206 acquires the drag start coordinates (Step 801), and then selects the coded image data existing at the drag start coordinates (Step 802). Next, the preview module 206 determines if the coded image data has been selected by the selection processing (Step 803). If it is determined that the coded image data has not been selected, the process returns. If it is determined in Step 803 that the coded image data has been selected, the preview module 206 specifies the coded image data as the move target (Step 804). Similarly to Step 607 above, the coded image data is specifiable as the move target if the coded image data existing at the coordinates acquired in Step 801 is found in the selection table. If the coded image data is specified as the move target, the preview module 206 temporarily makes the coded image data hidden (Step 805), and generates a temporary coded image data (Step 806).

In the embodiment, the temporary coded image data is an image that is temporarily displayed when moving or resizing (i.e., modifying the width and height of a rectangle, or modifying the shape thereof) the coded image data, and is image data with a color or frame applied thereto. The temporary coded image data is image data that takes less time to generate than the coded image data, the temporary coded image data used to enable the user to recognize the size (i.e., the width and height of the rectangle) and shape of the coded image data at a glance. This image data is stored in the RAM of the host computer 40, and is deleted upon completion of the move or resizing operation. Since in the move processing it is not necessary to change anything except for the coordinates of the coded image data according to the processing result, the coded image data before the move is copied and used.

Next, the preview module 206 determines if temporary coded image data is already being displayed (Step 807), and if so, the temporary coded image data is temporarily made hidden (Step 808). Subsequently, the preview module 206 acquires the current mouse coordinates in the middle of the drag (Step 809), and calculates the coordinates of the temporary coded image data region from these mouse coordinates and the drag start coordinates acquired in Step 801 (Step 810).

Figure 13:
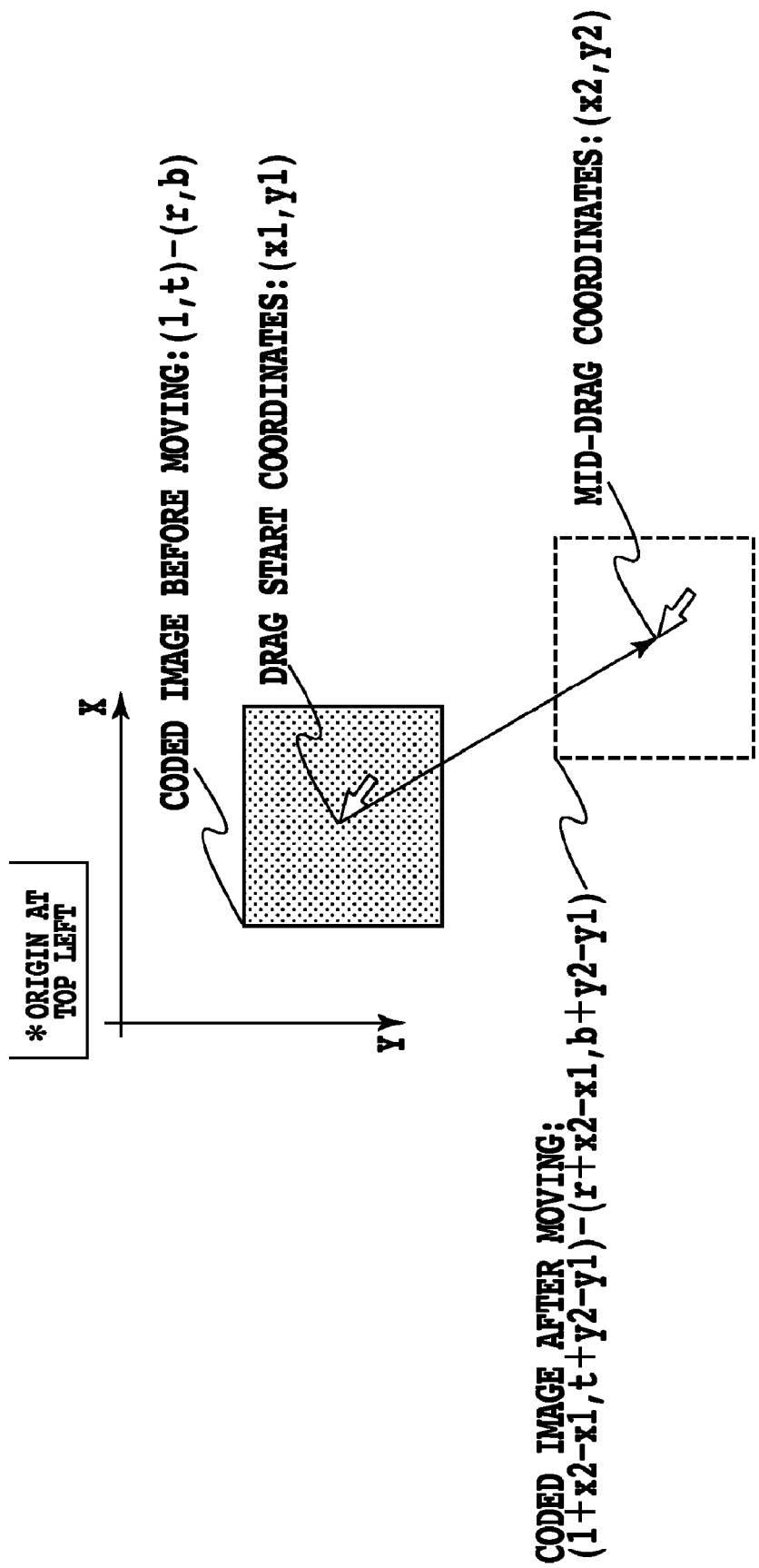
FIG. 13 is an explanatory diagram for an exemplary move processing, showing coordinates of a coded image after moving.

For example, consider the case wherein the coordinates of the coded image data before the move are (l,t)–(r,b), the drag start coordinates are (x1,y1), and the current mouse coordinates are (x2,y2). In this case, the current coordinates of the temporary coded image data region are given as (l+x2−x1,t+y2−y1)–(r+x2−x1,b+y2−y1) (refer to FIG. 13). The preview module 206 then updates the coordinates of the temporary coded image data region according to the coordinates calculated in Step 810 (Step 811), and displays the temporary coded image data (Step 812). Subsequently, the preview module 206 detects mouse input (Step 813) and determines if the drag has ended (Step 814). If it is determined that the mouse is in the middle of the drag, the process returns to Step 807, and Steps 807 to 814 are repeated. If it is determined in Step 814 that the drag has ended, the preview module 206 makes the temporary coded image data hidden (Step 815), and then deletes the temporary coded image data (Step 816). Subsequently, the preview module 206 acquires the coordinates of the drag end (Step 817), calculates the coordinates of the coded image data after the move in a similar manner to Step 810 (Step 818), and then changes the coded image data coordinates (Step 819). After the coordinate change, the preview module 206 displays the coded image data (Step 820), and the process returns.

In the coded image print dialog box shown in FIG. 10, it is not possible to configure settings such that two or more coded image data are printed on a single page. However, it is easy to extend the settings to allow printing of two or more coded image data. In such an extended case, it is also possible to allow the selection of two or more coded image data. In this case, there is the possibility that the two or more selected coded image data may be overlapping each other. For this reason, in Step 804, the selection table may be searched for the front coded image data existing at the drag start coordinates.

Figure 9:
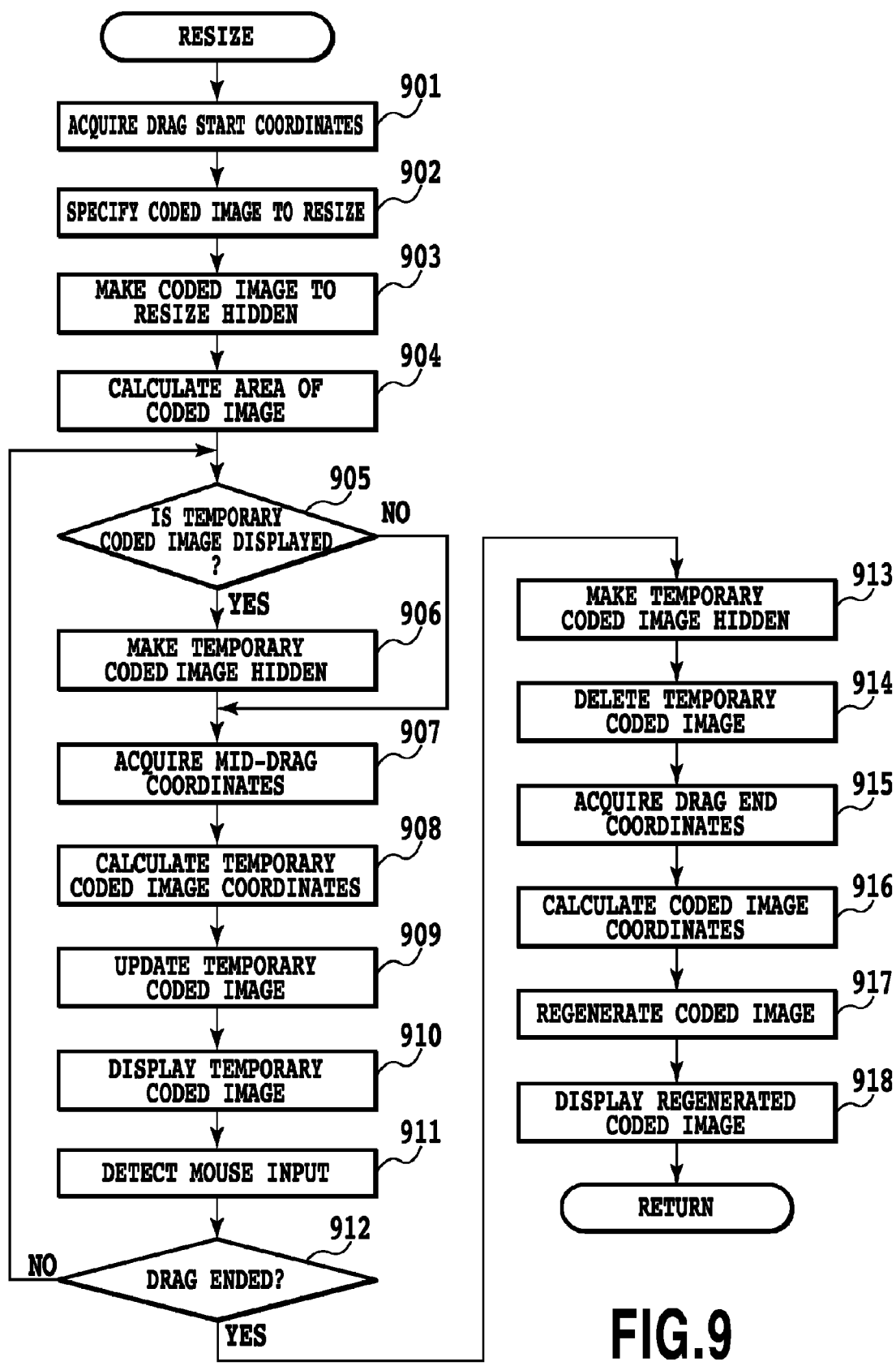
FIG. 9 is a flowchart showing an exemplary coded image combining print processing by a printer driver.

FIG. 9 is a flowchart illustrating an exemplary flow of the resizing processing 507 that is performed by the preview module 206.

The Resizing processing requires that factors such as the size (i.e., the width and height of the rectangle) and shape of the coded image data be controlled so that the amount of encoded information does not change. The embodiment is an example of the case where the amount of information encoded in the coded image data is determined by the area of the coded image data. Cases where the amount of information is determined by other factors are controlled by taking into account those other factors.

First, the preview module 206 acquires the drag start coordinates (Step 901), and specifies the coded image data that the user is trying to resize (Step 902). Similarly to the above Step 607, the coded image data is specifiable as the resizing target if the coded image data having a resizing handle displayed at the coordinates acquired in Step 901 is retrieved from the selection table.

Figure 14:
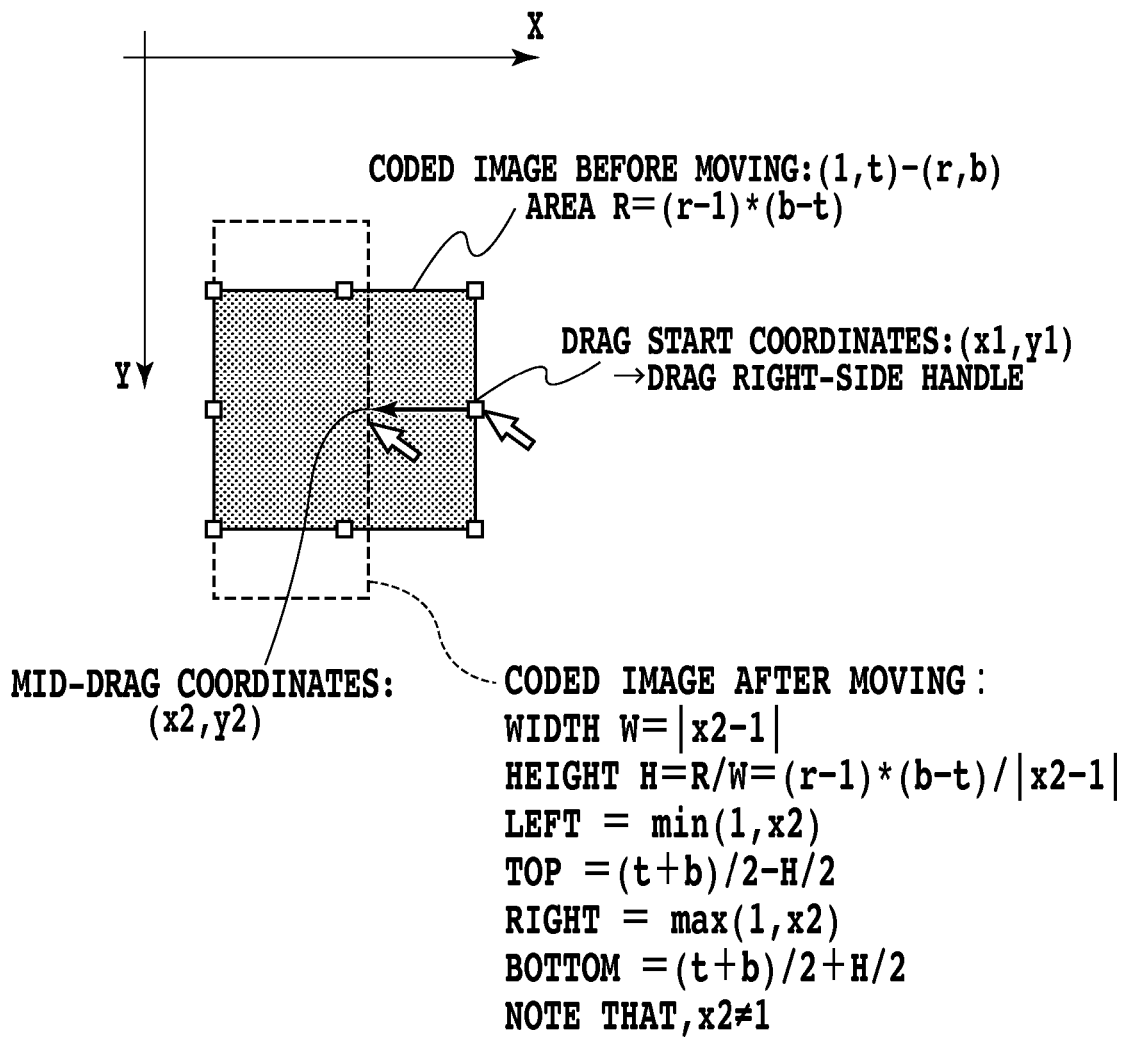
FIG. 14 is an explanatory diagram for an exemplary resizing processing, showing coordinates of a coded image after resizing.

If the coded image data is specifiable as the resizing target, the preview module 206 temporarily makes the coded image data hidden (Step 903), and then calculates the area of the coded image data (Step 904). The calculated area is used in a subsequent Step to obtain the coordinates of the coded image data. Next, the preview module 206 determines if temporary coded image data is already being displayed (Step 905), and if so, the preview module 206 temporarily makes the temporary coded image data hidden (Step 906). The preview module 206 then acquires the current coordinates of the mouse in the middle of the drag (Step 907), and then calculates the width, height, and coordinates of the temporary coded image data region on the basis of the mouse coordinates and the drag start coordinates acquired in Step 901 (Step 908). For example, consider the case where the coordinates of the coded image data region before the move are (l,t)–(r,b), the drag start coordinates are (x1,y1) (equal to the coordinates of the resizing handle on the right side), and the current mouse coordinates are (x2,y2). In this case, the current width, height, and coordinates of the temporary coded image data are calculated as follows (refer to FIG. 14).

Width=$|x2-l|$

Height=$(r-l)*(b-t)/|x2-l|$

Left=$\min(l,x2)$

Top=$(t+b)/2-H/2$

Right=$\max(l,x2)$

Bottom=$(t+b)/2+H/2$ wherein x2≠l.

Subsequently, the preview module 206 generates the temporary coded image data according to the coordinates calculated in Step 908 (Step 909), and then displays the temporary coded image data (Step 910).

The resizing processing requires that the coded image data be regenerated according to the processing results. However, it is time-consuming to successively generate correct coded image data during the resizing drag. Consequently, correctly sized temporary coded image data with a light color or only a frame applied thereto is generated, and this image is displayed.

In addition, if the temporary coded image data has already been generated, the coordinate position of the temporary coded image data region is updated in Step 909. Subsequently, the preview module 206 detects mouse input (Step 911) and determines if the drag has ended (Step 912). If it is determined that the mouse is in the middle of the drag, the process returns to Step 905, and Steps 905 to 912 are repeated. If it is determined in Step 912 that the drag has ended, the preview module 206 makes the temporary coded image data hidden (Step 913), and then deletes the temporary coded image data (Step 914). Subsequently, the preview module 206 acquires the coordinates of the drag end (Step 915) and calculates the coordinates of the coded image data after the resizing in a similar manner to Step 908 (Step 916). The image coding processor 208 then regenerates coded image data according to the calculated results (Step 917), and the preview module 206 displays the generated coded image data (Step 918). The process then returns.

In the coded image print dialog box shown in FIG. 10, it is not possible to configure settings such that two or more coded image data are printed on a single page. However, it is easy to extend the settings to allow printing of two or more coded image data. In such an extended case, it is possible to allow the selection of two or more coded image data. In this case, there is also the possibility that the resizing handles of the selected two or more coded image data may be overlapping each other. For this reason, in Step 607 the selection table may be searched for the front coded image data displaying the resizing handle at the drag start coordinates.

Second Embodiment

Figure 15:
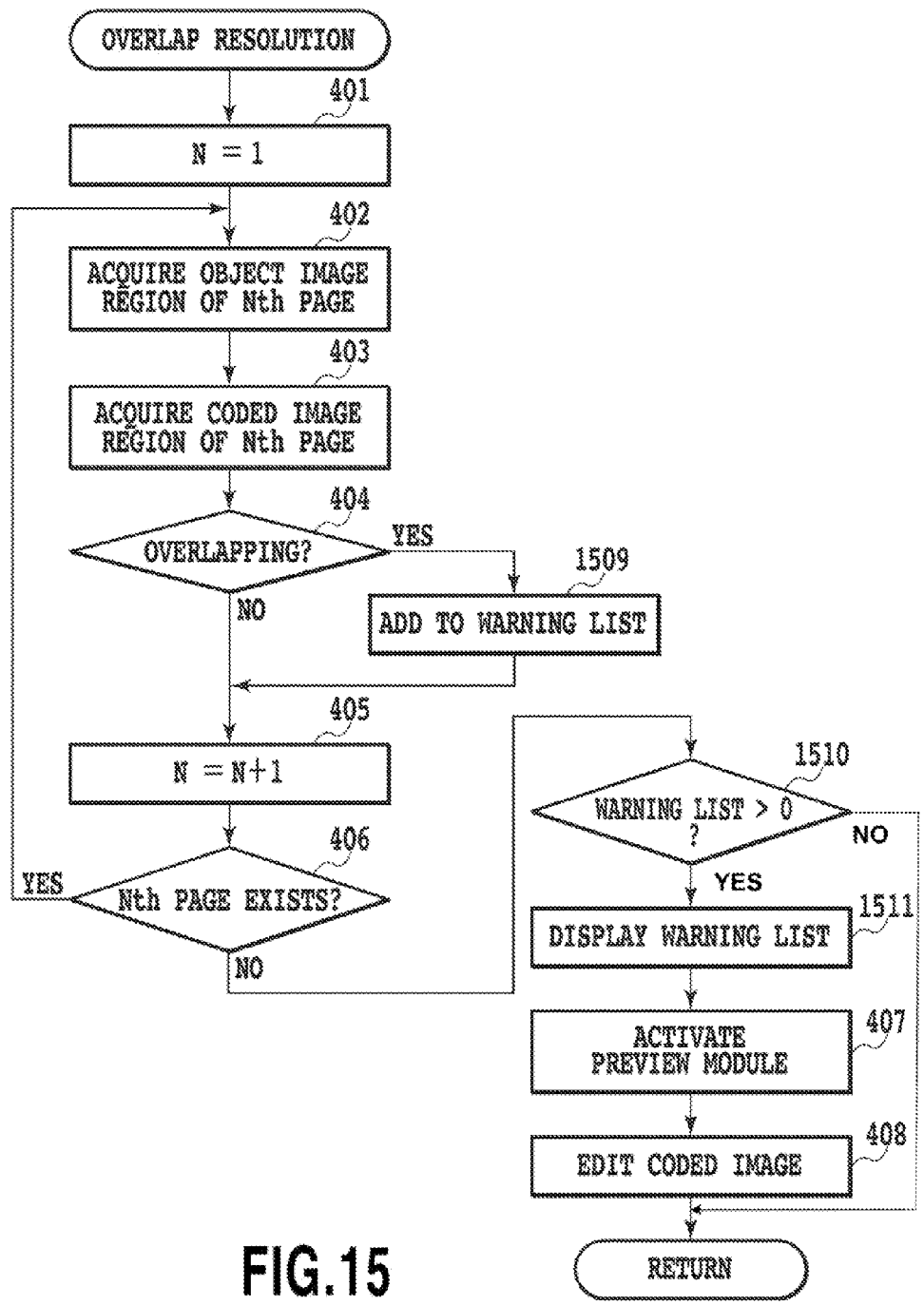
FIG. 15 is a flowchart showing an exemplary overlap resolution processing.

The overlap resolution processing of Step 305 shown in FIG. 4 activates the preview module 206 when it is detected that the coded image data is overlapping with the original image data on any one or more pages. Thus, the user does not recognize which one or more pages need to be edited. For this reason, the one or more pages that need to be edited can be presented to the user in advance by modifying this processing to be like that of the flowchart shown in FIG. 15.

Hereinafter, only the processes that are different from those of the flowchart in FIG. 4 will be described. Steps having identical reference numbers to those in FIG. 4 represent identical processes.

Figure 16:
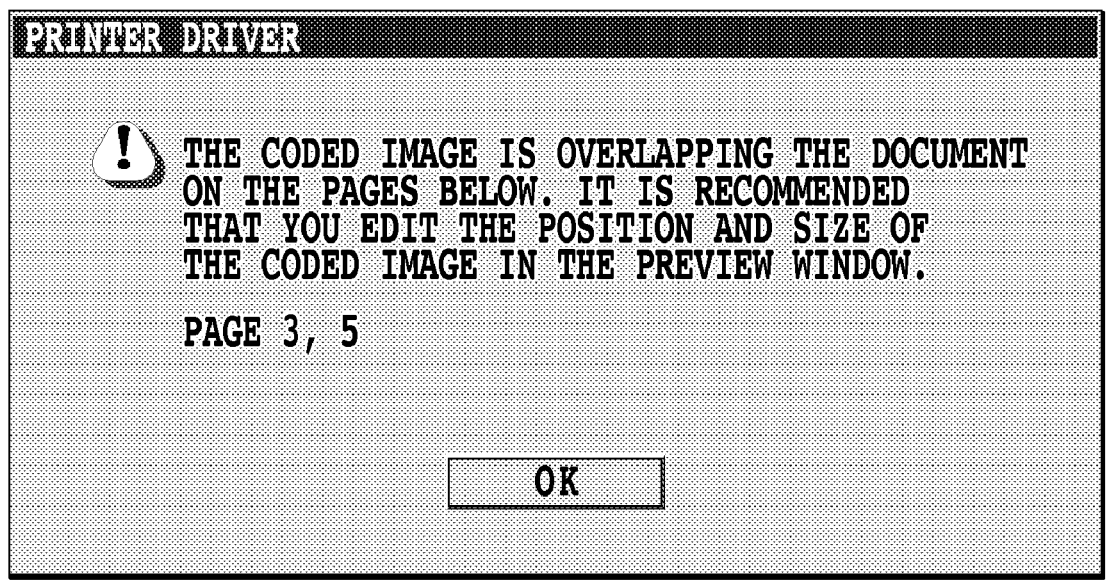
FIG. 16 is a diagram showing an exemplary warning list display screen.

First, if it is determined in Step 404 that the object region of the original image data and the coded image data region are overlapping, the page number N is added to a warning list (Step 1509), and the process proceeds to Step 405. The warning list is a list of pages that the user needs to edit, and is stored in the RAM of the host computer 40. When the processing of Steps 402 to 406 and Step 1509 has finished with respect to all pages, it is determined if the number of entries in the warning list is greater than 0 (Step 1510), and if greater than 0, the page numbers stored in the warning list are displayed (Step 1511), and the process proceeds to Step 407. FIG. 16 is an exemplary displayed screen for notifying the user of pages that need to be edited. If it is determined in Step 1510 that the number of entries in the warning list is 0, the process returns.

Other Embodiments

The invention may furthermore be applied to a system that includes a plurality of apparatus (for example, a computer, interface apparatus, a reader, a printer, etc.), or to a device composed of a single piece of apparatus (a multi-function device, printer, fax machine, etc.).

In addition, the object of the invention is also achieved by a system or the computer (or CPU or MPU) of a device reading and executing program code, the program code being recorded upon a recording medium and realizing the procedures of the flowcharts shown in the above-described embodiments. The recording medium herein refers to a computer-readable recording medium. In this case, the program itself, being read out from the computer-readable recording medium, realizes the functions of the above-described embodiments. For this reason, such program code, as well as the recording medium upon which the program code is recorded, constitutes an embodiment of the invention.

Examples of media that can be used as the recording medium for supplying the program code include floppy disks, hard disks, optical discs, magnetic optical discs, CD-ROMs, CD-Rs, magnetic tape, non-volatile memory cards, ROM and the like.

In addition, cases wherein an operating system (OS) or similar software in operation on a computer performs all or part of the actual processing based on the instructions of such program code, and thereby realizing the functions of the above-described embodiments, are also included within the scope of the invention.

Moreover, the program code read out from the recording medium may be written to memory provided on a functional expansion board inserted into the computer or in a functional expansion unit connected to the computer. Subsequently, based on the instructions of such program code, a CPU or similar component provided on the functional expansion board or in the functional expansion unit performs all or part of the actual processing, thereby realizing the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-121600, filed May 2, 2007, which is hereby incorporated by reference herein in its entirety.

What is claimed is:

1. A method for controlling an information processing device, the method comprising the steps of:
generating coded image data to be combined with original image data;
determining whether or not an overlap occurs between an object region within the original image data and a region of the coded image data;
generating temporary coded image data in place of the generated coded image data, upon the overlap being determined to occur in the determining step;
changing a region shape of the coded image data into a region shape of the generated temporary coded image data in accordance with instructions from a user; and
generating new coded image data, a region shape of the new coded image data conforming to the region shape of the temporary coded image data, and generating print data so that the new coded image data and the original image data are combined and printed.

2. The method of claim 1, further comprising the step of:
generating print data so that the original image data and the coded image data are combined and printed, upon the overlap being determined not to occur in the determining step.

3. The method of claim 1, wherein, in the changing step, the region shape of the temporary coded image data having been changed in accordance with previous instructions from a user is changed in accordance with new instructions from a user.

4. The method of claim 2, wherein, in the changing step, the region shape of the temporary coded image data having been changed in accordance with previous instructions from a user is changed in accordance with new instructions from a user.

5. The method of claim 3, wherein, in the changing step, the region shape of the temporary coded image data is changed in accordance with new instructions from a user while the area of the region of the temporary coded image data having been changed in accordance with previous instructions from a user is kept.

6. The method of claim 4, wherein, in the changing step, the region shape of the temporary coded image data is changed in accordance with new instructions from a user while the area of the region of the temporary coded image data having been changed in accordance with previous instructions from a user is kept.

7. An information processing device, comprising:
a computer;
a component for generating coded image data to be combined with original image data;
a component for determining whether or not an overlap occurs between an object region within the original image data and a region of the coded image data;
a component for generating temporary coded image data in place of the generated coded image data, upon the overlap being determined to occur by the determining component;
a component for changing a region shape of the coded image data into a region shape of the generated temporary coded image data in accordance with instructions from a user; and
a component for generating new coded image data, a region shape of the new coded image data conforming to the region shape of the temporary coded image data, and generating print data so that the new coded image data and the original image data are combined and printed;
wherein the components are implemented at least in part by the computer.

8. The device of claim 7, further comprising:
a component for generating print data so that the original image data and the coded image data are combined and printed, upon the overlap being determined not to occur by the determining component.

9. The device of claim 7, wherein the region shape of the temporary coded image data having been changed in accordance with previous instructions from a user is changed in accordance with new instructions from a user by the changing component.

10. The device of claim 8, wherein the region shape of the temporary coded image data having been changed in accordance with previous instructions from a user is changed in accordance with new instructions from a user by the changing component.

11. The device of claim 9, wherein the region shape of the temporary coded image data is changed in accordance with new instructions from a user while the area of the region of the temporary coded image data having been changed in accordance with previous instructions from a user is kept by the changing component.

12. The device of claim 10, wherein the region shape of the temporary coded image data region is changed in accordance with new instructions from a user while the area of the region of the temporary coded image data region having been changed in accordance with previous instructions from a user is kept by the changing component.

13. A non-transitory computer-readable recording medium having computer-executable instructions for performing a method of controlling an information processing device, the method comprising the steps of:
generating coded image data to be combined with original image data;
determining whether or not an overlap occurs between an object region within the original image data and a region of coded image data;

generating temporary coded image data in place of the generated coded image data, upon the overlap being determined to occur in the determining step;

changing a region shape of the coded image data into a region shape of the generated temporary coded image data in accordance with instructions from a user; and generating new coded image data, a region shape of the new coded image data conforming to the region shape of the temporary coded image data, and generating print data so that the new generated coded image data and the original image data are combined and printed.

* * * * *